April 16, 1957 W. KNIEHAHN 2,788,721

OPTICAL COMPOSING MACHINE

Filed Dec. 11, 1953 5 Sheets-Sheet 1

Inventor
W. Kniehahn
By Glascock Downing & Seebold
Attys.

Inventor
W. Kniehahn
By Glascock Downing & Seebold
Attys.

April 16, 1957 W. KNIEHAHN 2,788,721

OPTICAL COMPOSING MACHINE

Filed Dec. 11, 1953 5 Sheets-Sheet 3

Inventor

W. Kniehahn

By Glascock Downing & Seebold

Attys.

Inventor
W. Kniehahn
By Glascock Downing & Seebold
Attys.

Inventor
W. Kniehahn
By Glascock Downing & Seebold
Attys.

United States Patent Office 2,788,721

Patented Apr. 16, 1957

2,788,721

OPTICAL COMPOSING MACHINE

Werner Kniehahn, Berlin-Wannsee, Germany

Application December 11, 1953, Serial No. 397,633

Claims priority, application Germany December 13, 1952

7 Claims. (Cl. 95—4.5)

Figures 1, 2, 3, 4, 5, 6, 7, 8, 9, 10:
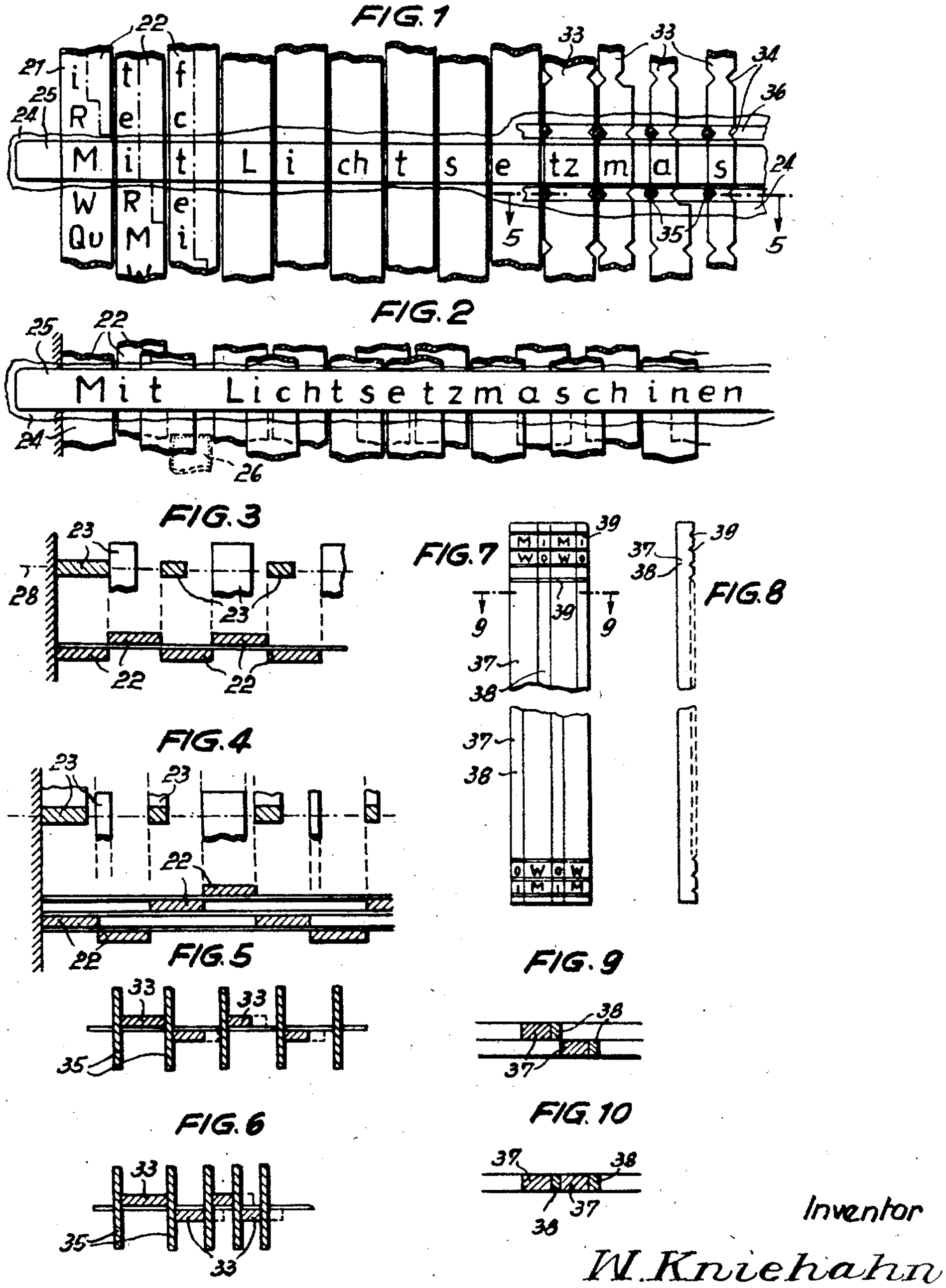

This invention relates to a type setting or composing machine of the kind in which optical images of the lines of letters are reproduced on a film sheet or directly on the carrier for the subsequent printing process.

Such optical type setting machines offer the advantage that an optically produced pattern can be used in the same way for relief printing, gravure printing and offset printing.

A further important advantage of such printing method consists in the fact that letters of different size can be obtained from the same original pattern by optical enlargement or reduction.

It is an object of the present invention to provide an optical type setting machine in which—similar to the various steps in line casting machines—the letters to be reproduced can be arranged side by side in an image slit, justified as to the spaces, and optically transferred to a light-sensitive material, in the form of a complete justified printing line.

With this and further objects in view, in an optical type setting machine according to the present invention a plurality of strip-shaped carriers on which letters are provided with their vertical extension parallel to the longitudinal direction of the strip are arranged side by side in a magazine from which the carriers are conveyed to a reproducing station, for side-by-side positioning of their letter-bearing surfaces, in such a way that one of the letters of each carrier strip, selected by depression of the key of a key board, is exposed in an image slit, disposed transversely to the longitudinal axis of the letter carrier and forming the line to be reproduced. By special spacing keys, per se known spacing members, such as plain spacing wedges or stick spaces are inserted adjacent to the last carrier of a word which has been set, before feeding the next desired carrier, in such a way that the images of the individual set carriers can be arranged in a row and justified in the image slit in accordance with the width of the letters and spaces between words. These lines of letters composed in the image slit may then be optically transferred and recorded in per se known manner, whereupon the carriers can be returned to their initial position.

The letters on the carriers may be formed with cylindrically curved surfaces, and moved in the longitudinal direction of their letters by a rotary drive. It is also possible, however, to provide carriers with plane surface of the letters. In this case, longitudinally acting conveying means may be engaged with the carrier for longitudinal movement thereof. In this way the circulation of single letters is avoided. The supply of the carriers from the magazine at right angles to the direction of the line takes place in a straight line direction and may be effected by depression of any one of the keys, with typing speed.

Only very small lateral displacing movements in the direction of the line are required in the justifying operation, so that the entire setting process including the justifying operation can be carried out with the same speed of writing as in case of the well-known line casting machines.

Moreover, the construction according to the present invention for the first time renders it possible to adjust the letter to be selected with a certain time lag after the depression of the key, independently of the operation of the key board with the rate of speed as usual with typewriting machines, the phase lagging or displacement being compensated during the justifying operation.

According to an important modification of the present invention letter carriers which in their exposed position are arranged with their exposed letter surfaces side by side to each other, with spacing members being inserted between the letter carriers, are made of a transparent material and guided with their letter surfaces in parallel planes which are relatively displaced at least by the thickness of the carrier material, and mounted so as to be slidable in these parallel planes in a longitudinal direction of the image slit, together with the spacing members.

In order to obtain a suitable alignment of the adjacent letter carriers in the image position, it has been found advantageous to make the carriers of a width which is varied in steps, according to the width of the letters.

In case of the above mentioned transparent carrier material arranged in separate planes the letter carriers are first adjusted in steps with the desired letters located side by side in the image slit, and closed up to the width of the letter, while overlapping each other for the rest. In the modification with carriers of stepped-off width, on the contrary, no overlapping by transparent material occurs as regards the rearward moved-up carrier, so that non-uniformities of the optical image are avoided. The variable width of the carrier strips may be obtained by stepping off the carrier strips, preferably in such a way that their width is increasing in accordance with the width of the letter, if the letters are arranged one below the other in a regular order from the narrowest to the widest one.

It is preferred, however, to make the letter carriers with a steadily increasing width adapted to the width of the letters which are arranged in a continuous order from the narrowest to the widest one. Where in this modification the letter carriers are fed to the image slit alternatingly in a forward plane and in a rearward plane, it is advisable to provide the letters on the rear face of the forward carrier, with reflected face, and on the front face of the rearward carrier; of course, in this case the carrier strip for reproducing the letter provided on the rear side must consist of a transparent material. This is important for the sharp optical focussing of the slit image, since the maximum possible coincidence of the planes is thus secured.

The closing-up of the letter carriers moved into the desired position with respect to the image slit is advantageously limited to the width of the letters applied on the carrier, in such a way that a spacing strip is moved with each letter carrier, which spacing strip is disposed at an angle to the face of the carrier, the face in its turn having a certain width in accordance with the width of the respective letter. Said spacing strips are disposed at an angle to each other from one set carrier to the next set carrier, so as to engage each other always only at the crossing point, in the width corresponding to the set letter, rather than with their entire longitudinal faces.

Where a spacing or double spacing wedge has to be set after the composing of a word, the spacing wedge serving as an interspace will be set after the spacing strip corresponding to the last set carrier, in the axis of crossing the strips. Thus when shifting means are applied in the axis of crossing, in an axial direction, all spacing strips crossing each other, together with the inserted spacing wedges will be pressed against each other and determine by their respective spacing width the arrangement of the letter carriers in a row, with due consideration of the width of the letters.

The complete line can be justified in the image slit by action upon the spacing strip, i. e. by exerting a pressure, transversely to the axis of crossing, upon the spacing wedges.

According to a particularly simple embodiment of the present invention the carriers are arranged in the magazine in pairs of parallel carrier strips in such a way that one of them is gradually narrowing in one direction, and the other one is gradually widening in the same direction, the letters being arranged thereon in a corresponding order, beginning with the narrowest and ending with the widest one on the first strip, and vice versa on the second strip, respectively, each pair of carriers being fed from the magazine to the image slit in a side-by-side position, but being then individually adjustable for reproduction of the selected letter of each of them. Such a pair of carriers having parallel outer walls and slanting inner walls is thus shiftable in itself.

It has been found that it is possible, for the most important types of letters, to arrange the letters in such a way that a continuous reduction of the width is obtained from each letter to the next one in the series of letters arranged on each carrier in a vertical row, with uniform distance between consecutive letters, so that the slanting edges between the two carriers of such a pair form a straight line. Where in case of special types of letters and with uniform distance between the letters slight differences are resulting, it is sufficient to make the carriers of a resilient material so as to ensure that such non-uniformities are compensated by slight deviations from the longitudinal axis of the face of the carrier, with corresponding deformation and bending of the material.

Such pairs of carriers may either be moved into image position in parallel planes differing from each other at least by the thickness of the carriers, arranged there in a row and adapted for justifying. Or, in order to obtain a very simple machine in which all additional spacing strips are dispensed with, they may be fed with their letter faces disposed in one plane, arranged in a row, and justified.

Optical means may be provided for focussing the slit image and adjusting its size with respect to a photographic layer, after the line has been composed and justified. In connection therewith, means are provided in the optical setting machine for photographing each slit image and for feeding the photographic emulsion carrier in steps after each individual exposure.

In order to render it possible to permanently observe the adjusting operation regarding the single letter carriers in the image slit and the justifying operation, before each individual exposure, it is preferred to arrange in the trace of the image rays, before the means for individual exposure, a ray divider, and to project the split-off ray through a separate optical channel with separate optical transmission and focussing means onto an inspection screen of ground glass arranged on the place of the operator.

In order to start the longitudinal feed motion of the letter carriers from the magazine and for setting each fed carrier for the reproduction of a selected letter it is advisable to provide a key board of the type used in the conventional type setting machines, which key board releases the respective foremost carrier of a magazine for longitudinal feeding by depression of a key of the key board, proceeding from the foremost to the next carrier, through known releasable stops or locks. The key itself then operates selectively means for setting a stop in the path of the advancing carrier, at such a point that the letter associated to the depressed key is exposed in the image slit, so that the feeding path of the carrier is defined accordingly.

Hereat, the stop releasing and stop setting means are progressively advanced from the first carrier field to the next one in a direction of the image slit, starting at the left hand end thereof.

Where pairs of carriers are used whose individual wedge-shaped carriers can be slided in relation to each other, the transmitting means cooperating with the depressed key act to set feed stops alternating from step to step and further stops corresponding to the variable location of the letter on its carrier, by means of separate members which can be controlled in a stepwise manner.

Advantageously the magazine contains, in a side-by-side arrangement, the greatest possible number of carriers of one type of letters which can be exposed in the image slit without interspaces according to the width of the line after justification. It will be understood, however, that it is not only possible to dispose one set of carriers of one type of letters in the magazine. It is also possible to provide several sets of carriers with different types of letters behind each other in the same magazine, or to provide several magazines each of which contains one set of carriers bearing a certain type of letters.

In this case, selector keys for the various types of letters are provided on the operator's place, and preferably on the key board, for releasing the foremost carrier in the selected magazine or set of carriers, while the letter key itself acts to set the respective stop in the feeding path of the carrier. Thus it is possible to change over from one type of letter to the next one, even in one line.

The operating motions of the key board are transmitted to transmitting members taking part in the stepwise motion, in per se known manner, by transverse control means.

It has been found, moreover, that it is possible, for simplifying such a machine, to mount the key board so as to travel synchronously with the carrier selecting step, so that the transverse transmitting means can be dispensed with.

Setting tests have shown that the stepwise advance of the key board is not disturbing for a skilled setter or compositor; however, this is only a possible modification.

After the adjustment of the single carriers for exposure of the desired letter in the image slit, which adjustment is caused by the aforementioned stopping of the feeding motion, by depressing the respective key, it is important to correct certain inaccuracies in the height of the letters in the image slit, which inaccuracies occur when setting the stops.

To this end, transverse wedge-shaped grooves are provided in the front face of the carrier, in the interspace between the letters, and resilient keys are arranged in a common guide disposed transversely to the longitudinal axis of the carriers, which keys engage in the said grooves and thus act to align all carriers with their letters to a common base-line.

It will be understood that said aligning means are retained during the advancing motion of the carriers, so that the base-line of the letters is aligned only after adjustment of the carrier by suitable coupling with the stepwise control. In the position of rest, all carriers are then returned jointly when the line has been photographed or corrections have been made and the carrier accordingly is to be released for the return motion.

For the simplified machine, in which pairs of carriers adapted to be parallelly arranged in one plane are longitudinally fed to the image point, it is advisable to use for the transverse feed of this pair of carriers in the direction towards the forward end of the line in the image slit a ratchet wheel travelling from the left to the right in steps, which ratchet wheel engages in the advance feed of the foremost carrier released from a magazine and on stepwise advance forces the fed and adjusted letter carrier into tight engagement with the stop ledge at the forward end of the line or with the already composed carriers or inserted spacing wedges.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 11:
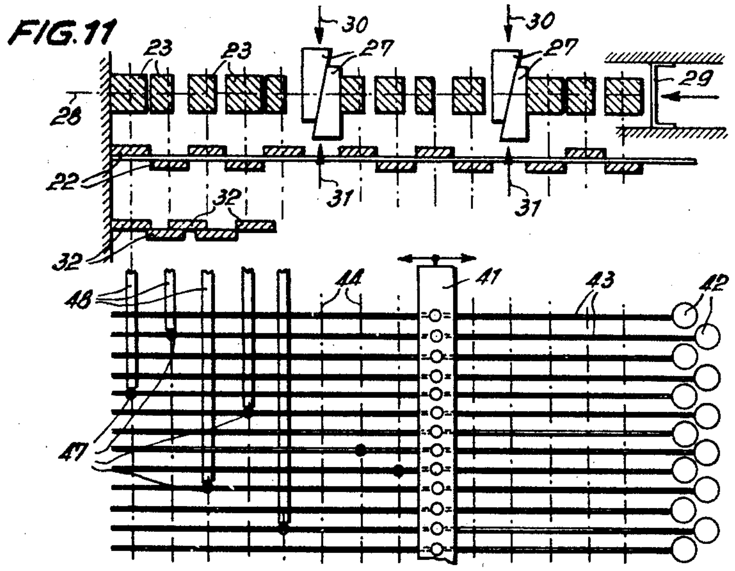
Figure 12:
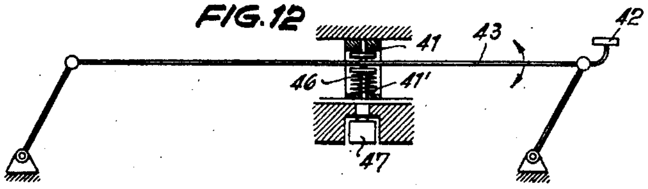
Figure 13:
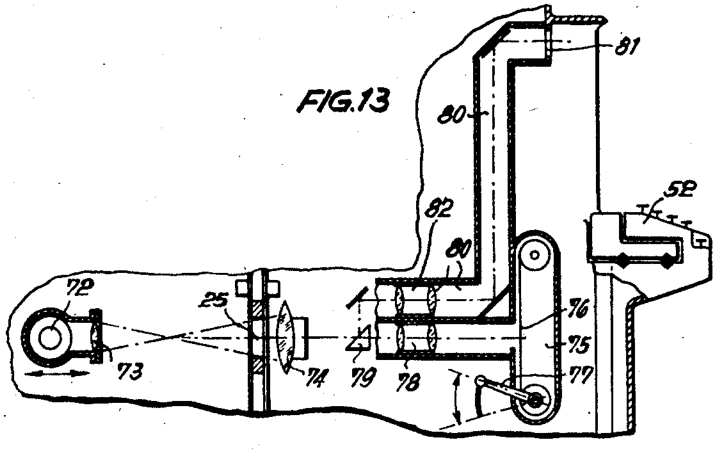
Figure 14:
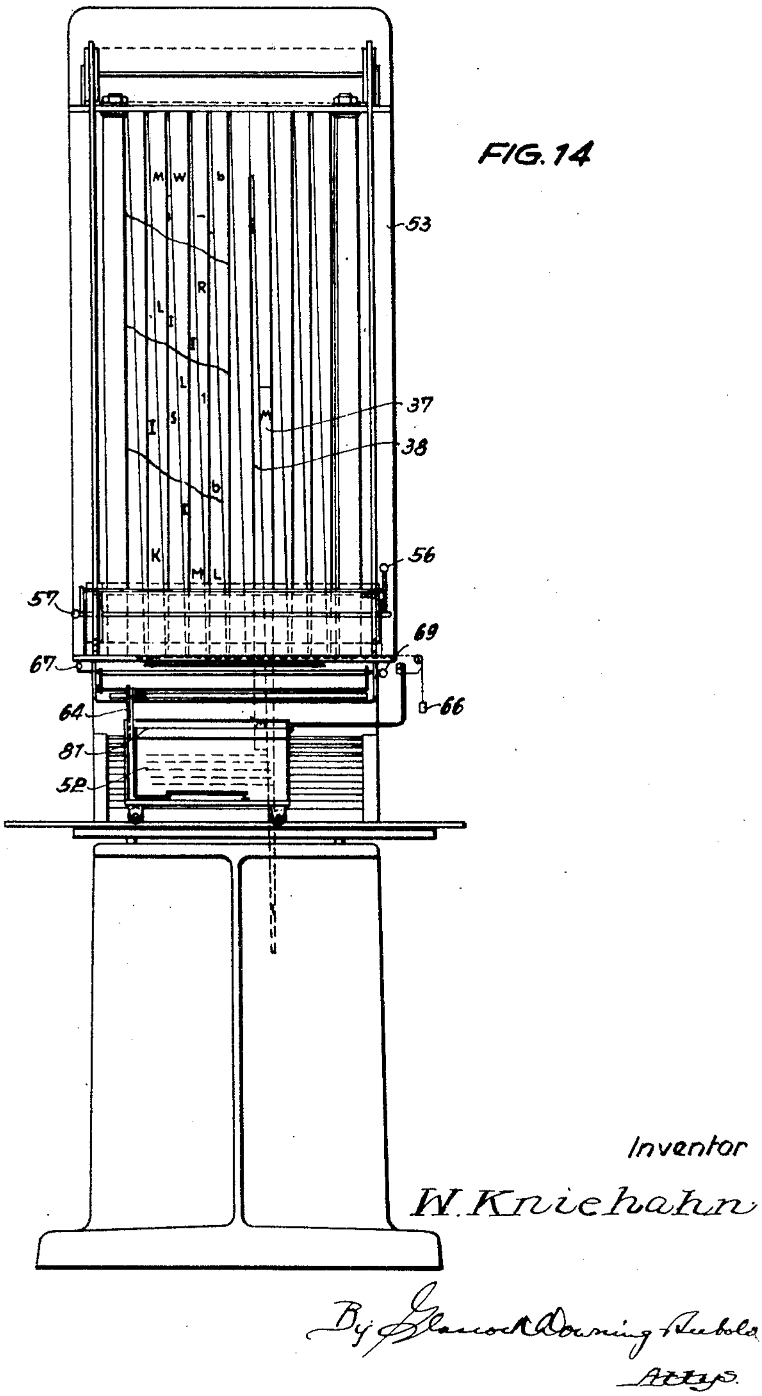
Figure 15:
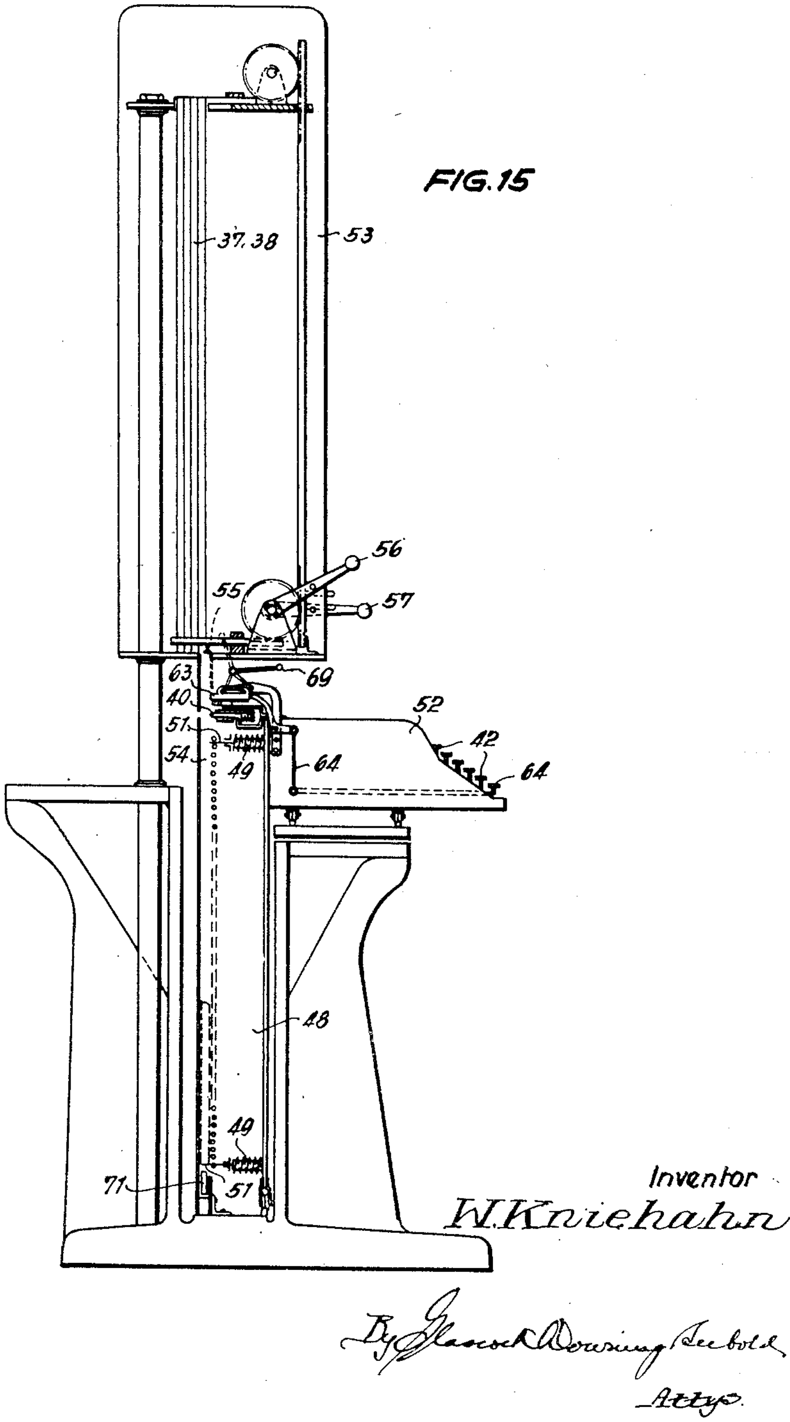
Figures 16, 17, 18:
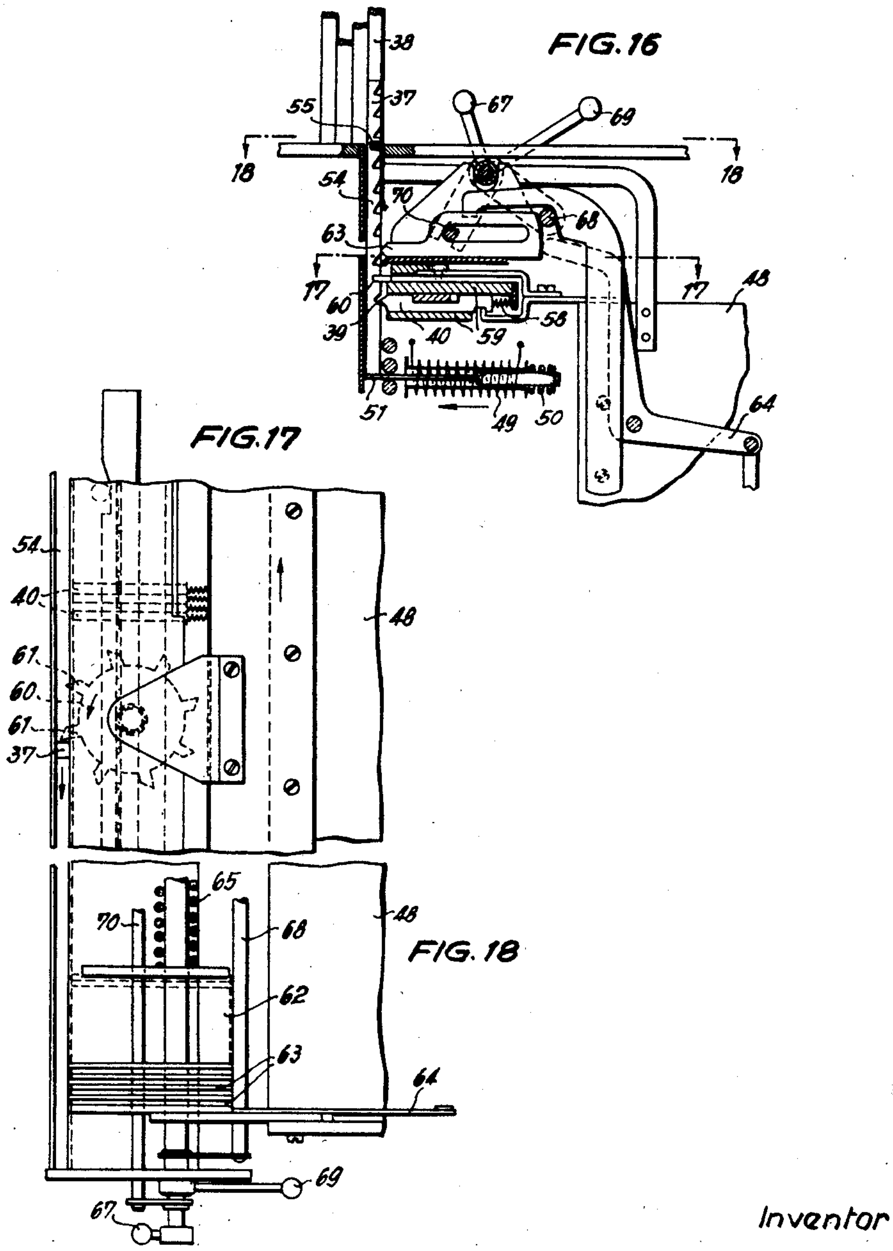

Fig. 1 is a view of a reproducing station with the letter carriers disposed behind the image slit, in a stepwise side-by-side arrangement, Fig. 2 is a similar view, in which the letter carriers are justified as regards their letters exposed in the image slot, Fig. 3 is a diagrammatic sectional view showing the parallel arrangement of letter carriers and appertaining spacing pieces, the letter carriers being arranged in two mutually displaced planes, Fig. 4 is a similar view, but showing an arrangement in which the letter carriers are displaced against each other in four planes, Fig. 5 is a section on line 5—5 of Fig. 1, in a non-justified condition of the elements, Fig. 6 is a similar view, but showing the elements in a justified condition, Fig. 7 is a view showing two pairs of carriers with letters whose width is steadily increasing in alternate directions, Fig. 8 is a side view of a letter carrier, Fig. 9 is a section on line 9—9 of Fig. 7 showing two pairs of carriers guided in two different parallel planes, Fig. 10 is a section on line 9—9 of Fig. 7 but showing two pairs of carriers which are guided in the same plane, Fig. 11 is a diagrammatic view showing the cooperation of the carriers with their spacing pieces and the device for adjusting the carrier in the image slit, Fig. 12 is a diagrammatic view showing the coupling between the keys and the device for setting the adjustable spaces, Fig. 13 is a diagrammatic view showing the optical means and the trace of the rays for reproducing and recording the slit image, Fig. 14 is a front view of an optical setting machine with the upper part of the front wall taken off, Fig. 15 is a side view of the same machine with the side wall taken off, Fig. 16 is a fragmentary view of Fig. 15, showing on a larger scale the adjusting device of the optical setting machine, Fig. 17 is a plan view and section of the adjusting device on line 17—17 of Fig. 16, and Fig. 18 is a section on line 18—18 of Fig. 16, showing the spacing pieces.

Similar reference numerals denote similar parts in the different views.

Referring to the drawings in greater detail and first to Fig. 1, it will be seen that a vertical row of letters are arranged on the face 21 of strip-shaped letter carriers 22, said letters being spaced from the left hand edge by a distance corresponding to one half of the normal distance between letters. Hence, depending on the width of the letter a margin of greater or smaller width is left free on the face 21 of the strips 22. As shown in Fig. 1, these letter carriers 22 are arranged with their longitudinal edges adjacent to each other, so as to leave narrow gaps between them. As will be seen from Figs. 3 to 6, they are guided in two or more different parallel planes. Associated to the letter carriers 22 are spacing pieces or wedges 23 which are connected to the letter carriers 22 so as to participate in the longitudinal motion thereof.

Preferably these spacing pieces 23 are arranged at an angle to the longitudinal axis of the carrier 22 and moreover these spacing pieces 23 are arranged at an angle, preferably of 90°, to each other from one set spacing piece to the next one. The width of said spacing pieces 23 is adapted to the width of the respective letter of the appertaining carrier 22 and the spacing pieces are slidably mounted, together with the carriers 22, transversely to the longitudinal axis or both.

As will be seen from Figs. 1 and 2, a frame 24 is preposed to the carriers 22 and the spacing strips 23 arranged behind the same, Fig. 3, a rectangular image slit 25 being provided in the frame so as to extend over the full width of the carriers which can be arranged side by side in the image position.

The set letters of the faces 21 will thus appear side by side in the image slit 25 of frame 24, but—as shown in Fig. 1 in the first grouping—with a non-uniform distance between the letters. However, since as shown in Figs. 3 and 4, the letter carriers 22 are mounted in different planes and both said letter carriers 22 and the appertaining spaces 23 are shiftable in a longitudinal direction of the image slit, the carriers 22 can be slided into overlapping positions, as shown in Fig. 2, together with the appertaining spacing strips 23, from the right to the left in the direction of the slit, to the normal width of letter, due to the stepped spacing strips 23.

Furthermore, by insertion of spacing members 26, Fig. 2, spacing between words can be formed in the image slit.

In the embodiment of the carriers as per the left hand part of Fig. 1 it is necessary to make the faces 21 of the carriers 22 of transparent material since they partly overlap each other. During the lateral sliding together of the carriers 22 in a direction towards the forward end of the line the spacing members 23 of a width corresponding to the width of their letters and arranged at an angle to each other are able to engage each other, thus defining the closing up and overlapping of the carriers 22 to the correct width of the letter.

Spacing strips 26 corresponding to the distance between words can either be put between the carriers 22 or inserted between the spacing strips 23 arranged at an angle to each other, in the axis of crossing 28 thereof, in the form of stick spaces or double spacing wedges 27 as will be seen from the diagram of Fig. 11. It will be understood from this diagram that as the right hand edge of the line is adjusted by the slide 29 in the region of the axis of crossing 28 and pressure is exerted on the double wedges 27 transversely to the longitudinal axis 28, in accordance with the pair of arrows 30, 31, the spacing strips 23 and the carriers 22 appertaining thereto will be closed up to letter width in the direction of the line and uniform spaces will be obtained between the words according to a predetermined right hand edge of the line.

The lower part of Fig. 11 in accordance with Fig. 2 shows the manner in which the carriers—now denoted 32—overlap each other after the justifying of the line.

A modified arrangement for aligning the carriers according to the width of the letters is illustrated in the right hand part of Fig. 1. In this case the carriers 33 themselves are stepped off in width according to the width of the letters, so that the provision of particular spacing strips 23 as shown in Figs. 3 and 4 and in the diagram Fig. 11 is not required.

In order to be able to align these stepped-off carriers according to the width of the letters and to ensure simultaneously a reliable alignment of the base-line, the side walls of these carriers 33 are provided with notches 34 for engagement therein of gripping pins 35 after the carrier has been fed and adjusted for the exposure of a desired letter in the image slit 25. Said gripping pins 35 are guided in special guide grooves 36 of the image frame 24 and are initially advanced, on a line corresponding to the normal non-reduced width of the carrier 33, between the carriers 33 which have been fed.

A longitudinal movement of these gripping pins 35 in the longitudinal direction of the line towards the forward end of the line, as shown in Figs. 5 and 6, will render it possible to close up the carriers 33, which are alternately guided in two different planes, to the width of the letter without mutual overlapping in the slit where the letters are exposed. The other letters occupying a broader space on the carrier 33 as far as they do not appear in the image gap, owing to their arrangement in different planes may overlap each other without any disturbance. This arrangement, therefor, can be used also in case of carriers whose exposure surface 21 consists of a non-transparent material.

Instead of shaping the lateral edges of such carriers 33 in the form of steps, it is also possible to arrange the letters in such a way, as shown in Fig. 7, that a wedge-shaped letter carrier is obtained.

In order to save width, two of such wedge-shaped carriers may be arranged side by side in such a way that, viewing in an upward direction one of the carriers, denoted 37, is steadily broadening from the narrowest to the broadest letter, while the other carrier, denoted 38, is steadily narrowing from the broadest to the narrowest letter.

Such pairs of wedge-shaped letter carriers advantageously are shaped in such a way as to form in their mutually engaged position an oblong rectangle in which the slanting inner edge of each of the carriers of this pair slidingly engages the slanting inner edge of the adjacent carrier.

The pairs of carriers 37, 38 of this shape may be guided alternately in different planes, as shown in Fig. 9, or, in the simplest form, the pairs of carriers 37, 38 may be fed to the image slot 25 in the same plane, for individual adjustment and justification of each carrier in this plane.

In order to be able to set the letters, after the basic or initial adjustment of the carrier, to a uniform base-line for the reproduction of a certain letter, it is preferred to provide notches 39 on the face between the single letters, both in case of the carriers 22 as per Fig. 1 or in case of the pairs of carriers 37, 38 as per Figs. 7 and 8, for engagement therein of an aligning key 40, Fig. 16, after adjustment of such a carrier 37 or 38.

As shown in Fig. 11, the adjustment of the carriers 22, 32, or 33, 37, or 38 may be achieved by a selector 41 proceeding from one carrier to the next one and mechanically inserting in the respective path 44 for the longitudinal feeding movement of the carriers 22, 33, 37, 38 just covered by the selector 41 a stop pin 47, in dependence upon the pressure on a selected key 42, in the row associated to the respective key 42, by means of a push rod 46 which is elastically coupled to the key rods 45, by springs 41', in such a way that a member 48 coupled with the longitudinal motion of the respective carrier can be advanced up to—or down to—this stop pin 47 only.

By way of alternative, and as shown in Fig. 15, a selector 48 comprising a multitude of electromagnets 49 arranged in accordance with the distance between the letters and the number of letters, and advancing in steps may be electrically influenced by operation of the key 42.

This arrangement operates in such a way that the respective electromagnet 49 associated to the depressed key 42 advances a stop strip 51 into the path of motion of the carrier 37, as per Fig. 16, against action of a spring 50. This stopping position is maintained electrically or mechanically up to the end of the reproduction of the line or until a correction has to be made.

In the optical setting machine as per Figs. 14 to 18 the particularly favorable form of wedge-shaped pairs of carriers is used. A multitude of pairs of carriers 37, 38, Fig. 14, are arranged side by side in one row in a magazine 53 arranged above the operating member 52, in accordance with the scheme of Fig. 7. As shown in Fig. 14, already about one half of the pairs of carriers 37, 38 of the foremost row have been adjusted.

It will be seen from Fig. 15 that further rows of such pairs of carriers are provided in the magazine 53 behind this first row. As shown in Fig. 14, each row is provided with a different type of letters.

A desired row and thus a desired type of letters can be moved in the magazine over a drop shaft 54 (see also Fig. 16), which in the position of rest is covered by a covering strip 55 which is rigidly connected with the intermittently moved selector 48 and with every step releases the foremost one of the carriers 37 or 38 out of the row of carriers resting thereon. To this end, the individual rows of carriers in the magazine 53 are moved forward by operation of the hand lever 56 or backward by operation of the hand lever 57 until the desired row of carriers will rest on the covering strip 55, above the drop shaft 54.

When one carrier 37 or 38 from a selected row of carriers is released by the covering strip 55 simultaneously with the release of the selector 48 for one step thereof, the respective carrier 37 is able to fall into the drop shaft 54', Figs. 15 and 16, until it strikes against a stop 51 which has been set by one of the electromagnets 49. When this rough adjustment of the carrier 37 has been finished and the selector 48 has been further advanced, one of the setting pieces 40 in the height of the roughly adjusted carrier 37 is released and the edge of the wedge-shaped projection of the respective member 40 will engage in the cross groove 39 of the carrier 37 under action of the spring 58, whereby the carrier with its letter image will be accurately aligned in the image slot so as to conform with a uniform base line. This conformity of all precision adjustments is effected by the fact that all of said setting pieces 40 are slidably held in a common longitudinal guide 59.

In addition to said vertical adjustment of the carrier 37 the carrier is moved in the direction of the line and towards the forward end thereof with every forward step, as shown in Fig. 17, by means of the ratchet wheel 60 which engages with one of its teeth 61 behind the carrier 37 in the drop shaft 54, until it strikes against the stop on the forward end of the line or on the previously set carrier, respectively.

In order to insert a space between two set letter carriers 37, 38, spaces 63 may be taken, after the previous carrier 37 has been set, from a magazine 62 travelling with the selector 48, by advancing the respective foremost spacing key into the drop shaft, through operation of the rod 64, and moving the selector 48 through a further step. These spacing keys, however, at the beginning of the setting operation are only slightly advanced into the drop shaft with the tip of their wedge, and caused to engage first on the preceding carrier 37 by movement of the ratchet wheel 60.

The supply of spacing keys in the magazine 62 is always compressed by a spring 65 in such a way that the spacing key which is next to the forward end of the line engages the push rod 64. As indicated in Fig. 14, a driving weight 66 may be used instead of the compression spring 65.

As the carriers 37, 38 in the drop shaft 54 have been moved into the position required for reproducing the respective sequence of letters constituting one line, and the spacing keys 63 have been inserted in the drop shaft between the words, a uniform pressure may be exerted upon the spacing keys 63, by operating the hand lever 67 acting upon the rods 68, for further advancing the tips of the spacing keys. Thus the carriers in the common drop shaft are justified in the direction of the line, by small lateral movements thereof.

After the photographing of the line image or for the purpose of correction all spacing keys can be withdrawn simultaneously by operation of the hand lever 69 acting upon the rod 70. Also after the photographing or during the correction of the line, as the case may be, all set stops 51 and setting pieces 40 are withdrawn from the drop shaft 54, by an operating member (not shown) in the vicinity of the keyboard, so that all set carriers 37, 38 etc. will fall within the drop shaft 54 down to their end position defined by a bar 71.

All set carriers 37, 38 are then returned to the magazine by means of special conveying means (not shown) through the bar 71 in the drop shaft 54. The selector 48 simultaneously moves back into its initial position and supports the row of raised carriers 37, 38 against falling once more into the shaft, as the raising bar 71 is returned to its position of rest shown in Fig. 15.

The optical image of the set line exposed in the image slot 25 may be produced by any trace of the optical rays. For instance, transparent carriers may be illuminated by transmitted light or non-transparent carriers with sharp contrasts may be illuminated by incident light.

Fig. 13 shows an optical system for illuminating the line and transmitting the image. A tubular source of light 72 irradiates the image slit 25 under action of inserted optical wide spreading systems 73. The irradiated image is paralleled by a further optical wide spreading system 74 and directly admitted into a camera 75 in which a film 76 can be advanced from exposure to exposure by intermittent feed in per se known manner through the operating lever 77. Inserted in the trace of the rays are optical widespreading systems 78 for focussing sharply. Preposed thereto is a prism or other ray dividing member 79 by which a partial wide bundle of rays is transmitted through an optical channel 80 and a mirror arrangement to a ground glass plate 81 in the vicinity of the keyboard 52. Also this channel 80 comprises optical widespreading means 82 for focussing. The image can be enlarged or reduced by axial displacement of the source of light 72 so as to properly adjust the distance of the source of light 72 from the image slit. The optical systems 78 and 82 in the trace of the rays behind the divider 79 may also contribute thereto.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. In an optical composing machine, a magazine, a plurality of carrier strips of a resilient material arranged in pairs of parallel strips, each strip provided on its face with a vertical row of letters, one strip of each pair steadily increasing in width from the narrowest to the broadest letter, the complementary strip steadily decreasing in width in the same direction from the broadest to the narrowest letter so each pair presents vertical parallel edges, an image slit arranged transversely of the longitudinal axis of the carrier strips, means for moving each pair of carriers jointly from the magazine to the image slit, means for adjusting each carrier of a pair individually for exposure in the image slit of a selected letter out of said row of letters, by relative sliding of the two carriers on their adjacent slanting edges, means for interposing variable spacing members between the carriers moved into exposure position, means for arranging the exposed letters in a row, means for justifying the parallel carriers and the interposed spacing members for obtaining a desired width of the line in the image slit and for obtaining a uniform arrangement of the letters and spaces between consecutive words, means for optical transmission and recording of the slit image, and means for returning the carriers into the magazine.

2. In an optical composing machine, a magazine, a plurality of parallelly arranged carrier strips each provided with a vertical row of letters on its face and with transverse wedge-shaped grooves in the spaces between the letters, an image slit arranged transversely of the longitudinal axis of the carrier strips, a key board, means for releasing the foremost carrier strip of the magazine for longitudinal feeding of the released carrier strip to the image slit in response to the depression of any one of the keys, stops adapted to be advanced into the feeding path of the carriers, means for advancing a selected stop for stopping the carrier strip feed movement at such a point to agree with the letter marked on such depressed key, so that the respective letter is exposed in the image slit, a guide arranged parallelly to the image slit, a plurality of spring-urged wedges slidably mounted in said guide and adapted to engage in the said grooves, means for forcing the wedges into the grooves after the carriers have been fed to their selected position, means for withdrawing the keys for releasing the carriers, means for advancing said carrier-strip releasing and stop-advancing means from a fed carrier strip to the succeeding one, for operation in the same way, means for interposing variable spacing members between the carrier strips means for justifying the parallel carriers by the interposed spacing members for obtaining the desired width of the line in the image slit, and uniform spaces between consecutive words in the line, means for optical transmission and recording of the slit image, and means for returning the carriers into the magazine.

3. In an optical composing machine a magazine containing a plurality of parallely arranged carrier strips, each provided on its face longitudinally with a row of letters, the said letters arranged in a continuous order according to their width, the said carrier strips increasing in width according to the continuously increasing width of the letters provided thereon from the narrowest to the broadest letter, an image slit arranged transversely across the longitudinal axis of the carrier strips, means for longitudinally moving the said carrier strips with their faces in one plane from the magazine to the image slit in succession, one moved carrier decreasing in width from the broadest to the narrowest letter, the succeeding carrier strip complementarily increasing from the narrowest to the broadest letter and so on, means for adjusting each carrier strip individually for exposure at the image slit of a selected letter from the individual row of letter provided on the said carrier strip, means for interposing variable spacing members between the carrier strips moved into exposure position, means for adjusting the exposed letters in a row, means for justifying the parallel carrier strip by the interposed spacing members between groups of letters forming words for obtaining a desired width of the line in the image slit, and a uniform arrangement of the letters and proper spaces between consecutive words, means for optical transmission and recording of the slit image, and means for returning the carriers into the magazine.

4. In an optical composing machine as claimed in claim 3, the said magazine containing a plurality of groups of carrier strips, each group carrying a different type.

5. In an optical composing machine as claimed in claim 3, the said magazine being provided with means for releasing the foremost carrier of the magazine for longitudinal movement of the released carrier to the image slit.

6. In an optical composing machine as claimed in claim 3, the said carrier strips being of resilient material.

7. In an optical composing machine as claimed in claim 3, the said variable spacing members between the carriers being in the form of double wedge members and adapted to be set and controlled accordingly.

References Cited in the file of this patent

UNITED STATES PATENTS

| | | |
|---|---|---|
| 602,439 | Friese-Green | Apr. 19, 1898 |
| 1,821,466 | Grass | Sept. 1, 1931 |
| 2,178,380 | Spievak | Oct. 31, 1939 |